United States Patent
Lehmann

(10) Patent No.: US 8,890,697 B2
(45) Date of Patent: Nov. 18, 2014

(54) POCKET ALERT FUNCTION FOR USE WITH RADIO AND MICROWAVE BROADCAST TELEPHONE AND SMART PHONE DEVICES

(71) Applicant: Harry V. Lehmann, Novato, CA (US)

(72) Inventor: Harry V. Lehmann, Novato, CA (US)

(73) Assignee: Green Swan, Inc., Novato, CA (US)

( * ) Notice: Subject to any disclaimer, the term of this patent is extended or adjusted under 35 U.S.C. 154(b) by 27 days.

(21) Appl. No.: 13/764,737

(22) Filed: Feb. 11, 2013

(65) Prior Publication Data

US 2013/0207808 A1     Aug. 15, 2013

Related U.S. Application Data

(60) Provisional application No. 61/597,465, filed on Feb. 10, 2012.

(51) Int. Cl.
| | |
|---|---|
| *G08B 17/12* | (2006.01) |
| *G08B 21/02* | (2006.01) |
| *H04B 1/38* | (2006.01) |
| *H04M 1/725* | (2006.01) |

(52) U.S. Cl.
CPC .............. *G08B 21/02* (2013.01); *H04B 1/3838* (2013.01); *H04M 1/72522* (2013.01); *H04B 2001/3844* (2013.01); *H04M 1/72569* (2013.01); *H04M 2250/12* (2013.01)
USPC ........... 340/600; 340/8.1; 340/10.2; 340/514; 340/517; 340/540; 340/541; 340/635; 340/638; 340/665; 455/505; 455/522; 455/575.5

(58) Field of Classification Search
CPC .............................. H08B 21/02; H04B 1/3838
USPC ........ 340/600, 801, 10.2, 514, 517, 540, 541, 340/635, 638, 665; 455/505.1, 522, 575.5
See application file for complete search history.

(56) References Cited

U.S. PATENT DOCUMENTS

| | | | |
|---|---|---|---|
| 6,456,856 B1 | 9/2002 | Werling et al. | |
| 6,934,515 B2 | 8/2005 | Wallach | |
| 7,146,139 B2 | 12/2006 | Nevermann | |
| 7,499,722 B2 | 3/2009 | McDowell et al. | |
| 2010/0097228 A1* | 4/2010 | Schultz et al. | 340/600 |
| 2011/0077055 A1* | 3/2011 | Pakula et al. | 455/567 |

OTHER PUBLICATIONS

Swicord, M.L., Davis, C.C., "An Optical Method for Investigating the Microwave Absorption Characteristics of DNA and other Biomolecules in Solution," Journal of Bioelectromagnetics, 1983; vol. 4(1);21-42; abstract.

* cited by examiner

*Primary Examiner* — Tai T Nguyen
(74) *Attorney, Agent, or Firm* — Duane Morris LLP

(57) ABSTRACT

Mobile devices may minimize the radiation exposure to users by controlling the distance between the user, specifically the groin area, and the mobile device to a minimum distance. The reduction in exposure is realized due to the operation of the Inverse Square Rule on electromagnetic signal from the mobile device recognizing there is a steep fall off of signal strength resultant from increased distance between the head of the user and the source of the signal. Embodiments alert the user to a mobile device in the users pocket is in a transmission mode and thus should be removed from the users pocket to maintain operational distance between the user and the device to reduce signal absorption of the users reproductive organs. Enabled mobile devices detect the transmission mode and the acceleration of the device in determining whether to alert the user. Embodiments influence the user to maintain a minimum distance via alerts, interruptions and warnings. Thus maintaining a minimum distance between the user and the transmitter may have a dramatic practical effect.

14 Claims, 1 Drawing Sheet

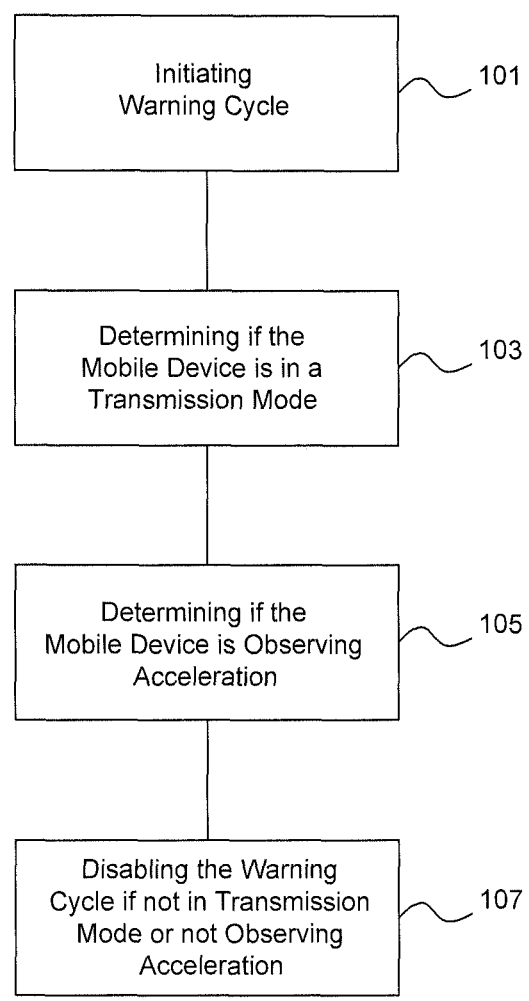

POCKET ALERT FUNCTION FOR USE WITH RADIO AND MICROWAVE BROADCAST TELEPHONE AND SMART PHONE DEVICES

CROSS REFERENCE

This application is a non-provisional application claiming priority of provisional application: Application No. 61/597,465 entitled POCKET ALERT FUNCTION FOR USE WITH RADIO AND MICROWAVE BROADCAST DEVICES INCLUDING BUT NOT LIMITED TO CELLULAR TELEPHONE AND SMART PHONE DEVICES. The entirety of the referenced provisional application is incorporated herein by reference.

BACKGROUND

The disclosed subject matter is directed to minimizing the exposure to electromagnetic waves and non-ionizing radiation due to use of mobile appliances. This disclosure uses mobile device, mobile appliance, cell phone, cellular phone, wireless phone, wireless device, mobile phone and mobile radio, as well as phone, telephone, cell and radio interchangeably and the use of such terms is not exclusive and is intended to encompass all communication devices and apparatuses that transmit radio waves during communications and are held or located in close proximity to the user.

Microwaves are absorbed by living tissues at 24 times the rate of their absorption by pure water. While the Specific Absorption rate, one standard by which cellular microwave absorption by the body is commonly measure, is typically based upon a penetration through an inert emulation of a human head, competent experimental work indicates that the level of absorption in living tissue is many times greater than the level of microwave absorption through an inert liquid, such as water.

In a 1983 article entitled An Optical Method for Investigating the Microwave Characteristics of DNA and other Biomolecules in Solution, by Mays L. Swicord and Christopher C. Davis, published in the journal Bioelectronmagnetics, experimental results were reported which determined that "A significant increase in the absorption of DNA solutions as compared with pure water has been observed that is consistent with microwave absorption by the longitudinal mode of the double helix". Thus, in their conclusion Swicord and Davis state that: However, the results presented in this work are in good agreement with the Prohofsky model of acoustic mode absorption by varying lengths of DNA. Prohofsky and Van Zandt predicted that 450 to 2000 base pair segments of synthetic DNA should absorb $10^3$ to $10^4$ times as strongly in the microwave region as an equivalent mass of water with a decrease in peak absorption due to water damping. The 1.7% dilution of DNA investigated by PFLOH spectroscopy in this work indicated a 40% increase in absorption above pure water at 8 GHz and at 10 to 12% increase at 12 GHz. The measured DC conductance of this DNA sample was quite low yet its absorption coefficient was still 25% higher at 8 GHz than a saline solution of 20 times greater DC conductance. We conclude therefore that the observed absorption of the DNA solution does not come from ionic behavior.

The observed absorption is suggestive of direct microwave absorption by the longitudinal acoustic mode of the double helix discussed by Prohofsky and co-workers. Based on the concentration of DNA solution which gave 40% more absorption than pure water at 8 GHz, the microwave absorption of DNA at this frequency is 24 times greater than an equivalent mass of water."

This finding that there are many orders of magnitude of increase in microwave absorption when DNA is present, may likely explain the considerable body of experimental evidence strongly indicating a relationship between long term mobile device use, and diseases involving DNA strand abnormality, such as brain cancer. As, due to the Inverse Square Law, the strength of a radio broadcast or any point source or radial field will be inverse to the square of the distance from the source, exposure levels will diminish rapidly with distance, and a device which occasions increased distance will thereby reduce signal strength absorbed by the human head.

Scientific studies [i.e, H. Lai et al, from the University of Washington, 1984, 1988, and as presented in 1998, Vienna, Austria, and 2009 in Stavanger, Norway; O. Johansson, Associate Professor, Dept. of Neuroscience of the Karolinska Institute, Stockholm, and Professor, Royal Institute of Technology, Stockholm, as presented in 2009 at Stavanger, Norway; Carl F. Blackman a founder of the Bioelectromagnetics Society, as presented in 2009, at Stavanger, Norway; Martin Blank, Ph.D., Associate Professor, Columbia University, as presented in 2009 Stavanger, Norway, Franz Adlkofer, M.D., doctorate from the Max Planck Institute for Biochemistry as presented at Stavanger Norway, 2009, also the following presenters at the International EMF Conference 2009 at Stavanger, Norway: Lukas h. Margaritis, Ph.D., Greece; Elihu D. Richter, MD, M.P.H., Israel; Alvaro Agusto A. de Salles, Ph.D., Brazil; Fredrik Soderqvist, Ph.D., Sweden, Yuri G. Grigoriev M.D. Sci., Russia; Anton V. Merkulov Ph.D., Russia] have shown potential health risks, in some instances showing DNA breakage, as associated with human exposure to non-ionizing radio wave sources, including but not limited to those emitted from mobile telephone devices and handsets, including but not limited to cellular telephones, satellite telephones, cordless telephones, and also portable computers, including those equipped with wi fi connectivity capacity. Continuing research supports that such health risks as may be associated with proximity to non-ionizing radiation will be reduced if level of exposure is reduced.

As used here, the term "non-ionizing radiation," is in reference to types and frequencies of radiation which do not have the capacity to force electron shifting at an atomic level, including with molecular effect. As used here, the term "ionizing radiation" is in reference to types and frequencies of radiation which do have the capacity to force electron shifting at an atomic level, including with molecular effect.

Microwave devices, including variants of mobile and portable telephone devices broadcast electromagnetic waves, including but not limited to the radio waves which serve as conduit for the transmission of information, by modulation of amperage or frequency or varying combinations thereof. As discussed above there is competent scientific data indicating that information carrying microwave broadcast near the human body will result in DNA damage and can result in the formation of cancers.

Recent research has shown that cellular telephones, at a distance from observed sperm samples consistent with the typical distance from a cellular phone to a male's testicles, if the mobile phone is held in the front pocket, will result in a fifty percent reduction in live sperm in the samples, according to Ashok Agarwal, PhD, head of the andrology laboratory and the director of the center for reproductive medicine at the Glickman Urological and Kidney Institute at the very prestigious Cleveland Clinic in Ohio.

The Cleveland researchers collected semen samples from 32 men and divided each man's sample into two parts. They placed half of the semen samples 2.5 centimeters away from a 850 MHz frequency cell phone in talk mode for one hours.

Most cell phones used in the U.S. are 850-900 MHz. They chose this distance because it is the typical distance between the testes and the trouser pockets. According to Web MD, where a report on this study can be found previous research from the same group showed that radio frequency electromagnetic waves emitted from cell phones can impair sperm quality, and the new study shows why this may occur. Semen exposed to radio frequency electromagnetic waves emitted from cell phones had higher levels of damaging free radicals, lower sperm motility (the ability of the sperm to move and swim) and sperm viability (the percentage of live sperm), and possibly greater oxidative stress, the Cleveland study shows.

Earlier reporting to the same effect by these Cleveland researchers was sufficiently credible that their findings in this area have been published through the NIH. In the just referenced NIH report, apparently preceding the more recent work cited above, the conclusion reached was that the "use of cell phones decrease the semen quality in men by decreasing the sperm count, motility, viability, and normal morphology. The decrease in sperm parameters was dependent on the duration of daily exposure to cell phones and independent of the initial semen quality.

Thus, in addition to risks presented to the head and to the body generally, there is documentation from prestigious sources that the carrying of a cellular telephonic device in the "on" condition in the pockets of human males will result in diminished quality of sperm in those males.

Some of these deleterious effects have begun to be recognized and have led to some prior art solutions. These prior art solutions however are in contrast to the solutions described in the current application in that the prior art solutions are directed to controlling the emitted signal power level of the transmitter to reduce exposure levels. These prior art solutions include:

U.S. Pat. No. 7,499,722 to McDowell et al entitled "Proximity Regulation system for Use with a Portable Cell Phone and a Method of Operation Thereof" discloses a portable cell phone including a sensor that determines the proximity of the sensor to a designated part of a user's body (including the head), and controls the transmit power level in response. Thus the transmit power level of the phone is controlled to various "allowable proximity transmit power levels" depending on the vicinity of the portable cell phone to different parts of the user's body.

U.S. Pat. No. 7,146,139 to Nevermann entitled "System and Method for Reducing SAR levels'" similarly discloses a mobile communications device having a sensor assembly for detecting proximity to a human body and a controller to reduce the average power level of the communication device to less than a predetermined acceptable level. Nevermann discloses that in some embodiments, the power level may be reduced only to the point necessary to maintain adequate signal strength, while in other embodiments the power level may be reduced as required regardless of signal strength in which case a communications link may be dropped.

U.S. Pat. No. 6,934,515 to Wallach entitled "Electromagnetic Radiation Alerting Device for Use With a Cellular Telephone" discloses a phone that is operable in different modes selected by the user (such as "near", "normal" and "far" that are calibrated for different distances of the user's head from the antenna), a RF sampling unit for measuring the EMF generated by the cell phone's antenna during its active transmission times and an alerting unit (audio, buzzer, visual) that alerts the user when a predetermined radiation level is exceeded for the selected mode of operation.

U.S. Pat. No. 6,456,856 entitled "Mobile Radio Equipment forming Antenna Pattern to Protect User From Radiation". This reference discloses a proximity detection device for measuring humidity or temperature and to detect the presence of human tissue in the vicinity of the device and to adjust transmit power in a directional antenna as a function of the data produced by the detector.

The prior art however fails to recognize that providing information to the user in the form of a warning or other alert may manifest a change in the habits or manner of use of the mobile devices by the user, the prior art approach fails to adequately address the problem.

In order to address the detrimental effects described above and obviate the deficiencies of the prior art, the present subject matter discloses controlling the distance between the user, specifically the groin area, by alerting the user, the mobile device is located in the pocket and thus less than a desired minimum distance. The advantageous reduction in exposure is realized due to the operation of the Inverse Square Rule on electromagnetic signal from cellular and other radio devices, in that there is a steep fall off of signal strength resultant from increased distance between the groin area of the user and the source of the signal, as a class, devices which result in increased distance between the user and the broadcast device will result in a diminution of signal absorption which, while situational variable, can be dramatic in practical effect. As described herein, the disclosed embodiment influencing the user not to put the phone in the pocket and thus maintain a minimum distance via alerts, interruptions and warnings.

These and many other advantages of the present subject matter will be readily apparent to one skilled in the art to which the invention pertains from a perusal of the claims, the appended drawings, and the following detailed description of preferred embodiments.

BRIEF DESCRIPTION OF THE DRAWINGS

FIG. 1 is an illustrative example of an embodiment of the present subject matter.

DETAILED DESCRIPTION

Embodiments of devices and methods described herein reduce end user exposure to radiation. While these devices and methods are intended for protection from non-ionizing radiation, such as that emitted from cellular telephones, each embodiment and illustration may also be practiced with regard to ionizing radiation.

As to the handheld radio communication devices, embodiments discloses serve to reduce human user electromagnetic wave exposure from such devices through the strong encouragement of increased distance between the radio-wave source and the head of the user. Mobile devices incorporating the disclosed subject matter significantly reduce the level of microwave signal strength to which the end user would otherwise be exposed from the mobile device.

The disclosed subject matter successfully detects (by elimination method as herein after discussed) that a cellular device is being carried in a pocket and can issue a warning which will only be detected by the end user when said cellular device, in the "on" condition and is residing in the pocket of the end user. The disclosed subject matter provides the end user with a method such that the end user is reminded and alerted to the fact that the cellular device, when "on" is in the pocket of such end user, so that the consumer is reminded to remove the device from his pocket, and place it in a safer location, such as a jacket pocket, approved holster, briefcase or luggage.

At present cellular devices do not normally come equipped with the capacity to sense and report ambient temperature, nor the ability to differentiate one light limited enclosed space from another. Both of which would be beneficial in attempting to determine if a mobile device was within a user's pocket. The challenged addressed by the disclosure of the current subject matter is how to provide a warning to the end user, when that end user's cellular devices is in his or her pocket such that said warning would be perceived by the end-user when the cellular device is both in the pocket of the end user and in the one condition.

It should be noted at the onset that, mobile device, mobile appliance, cellular phone, cellular device, mobile phone, mobile, cellular, phone, are used interchangeably and all meaning a generic cell type phone, or a portable device that wirelessly transmits radio waves. There is no distinction intended be the use of one of these terms over another. It should also be noted that the "on" condition referenced in the current disclosure is and condition in which the mobile device may transmit, whether the transmission is a pilot signal, control signal, data transmission signal, voice transmission signal, etc. The "on" condition need not be associated with only with active transmission, but rather with a mode in which transmission is likely. An off condition would mean transmission is not possible, or only low power transmissions are possible such as near field and wi-fi communications. Modified "on" conditions are also envisioned wherein one or more of the transmission circumstances are not consider "on."

The system and method of the current disclosures provides a solution to a cellular device owner through computer programming, though which an application was developed, a variant of which can be tailored for any cellular device, which does the following ☺ A provides a distinct vibration signal (in one embodiment a three burst signal which is distinct from commonly encountered vibration signals for incoming calls). The default state of such programming is that the programmed vibration is in a "constant on" condition, and will issue a vibratory warning or alert on a timed interval basis, at all times, unless certain limiting factors are present. The limiting factors ensure that the alert will most likely activate when the device is within the pocket of the end user. One limiting factor is that of acceleration. The mobile device is programmed such that its monitors acceleration with an accelerometer and will disable the warning is no movement or acceleration has been detected within an adjustable increment of time, the adjustable increment of time being less that the programmed vibratory cycle, such that a detection of "no movement" will disable the distinct vibration signal, the effect of which is that the device will vibrate as programmed whenever held in a situation such that motion is or has recently been occurring, but will not vibrate when the motion has not been occurring. It is also envisioned that the resulting vibration should not be perceptible, or sufficiently attenuated if the device is carried in a bag or brief case. But will only be detectable with in direct immediate contact with the body of the end users. Similarly, the devices will automatically disable the vibration function whenever the device is put in a static "no movement" condition.

Therefore, as described above, the mobile device as described in current disclosure only operates the pocket alert or warning when movement has been detected and disables it the alert or warning in the absence of movement. In addition the warning only operates when the mobile device is in the "on" condition or a sub "on" condition as described above. One sub "on" condition would exclude the period when a voice call is ongoing, since in such a scenario it is likely that the user is engaged in a conversation and thus the phone is not in his/or pocket, another sub "on" condition may also exclude active surfing, which may be evidenced by keystrokes or other user interactive with the device. Combinations of sub "on" conditions are also envisioned. When the transmitter of the mobile device is disabled, it is not in a transmission mode, however, when the transmitter is in standby it may be in a transmission mode. In short, it the transmitter is not likely to engage in transmitting, such as when it is disabled, it is not considered to be in an on condition, however, if the transmitter is simply not presently transmitting but would likely transmit over a proximate period of time, it could be in a transmission mode.

FIG. 1 is an illustrative method to alert a user of a mobile device located in the user's pocket in order to prevent an unsafe exposure of radiation to the user's groin area. The method includes initiating an user warning cycle on the mobile device with a predetermined cycle as shown in Block 101. The cycle includes a period in which an alert is active (vibrating or sounding) followed by a period in which the alert is not active (not observable or quiet). The period of the predetermined cycle may be set as a default by the manufacturer or adjustable by the user.

In the embodiment of FIG. 1, it is then determined if the mobile device is in a transmission mode from a predetermined group of transmission modes as described above, as shown in Block 103, and it is also determined if the mobile device is observing acceleration as shown in Block 105. The acceleration occurring concurrent or proximate in time to the determination. As shown in Block 107, the user warning cycle is disabled if the mobile device is determined not to be in a transmission mode or has not observed acceleration over the predetermined period of time.

Another limiting feature may be that of angle of incident of the mobile device. By this is meant an angular position measurement switch such as of the sort used in currently marketed battery operated equipment which have automatic angular recognition, such as with the auto on/off function of the certain Bushnell equipment such as the 1 X 28 Red Dot Sight with auto on/off. Thus, when flat on a table, or within such other angular positions as the manufacturer may elect, the Method and Device may default to the off condition. Such that when the mobile device is in an orientation that would not likely be experienced when in a user's pocket, the alarm may also be disabled. Such as when traveling in a car or on a train. On such orientation may be one of flat and level, indicating the mobile device is on a table or lying on a seat.

It is preferable that the programming of the device be downloadable and make use of features of the mobile device that are typically resident, to the extent possible. It is also preferable that the time durations or periods of the acceleration and vibration cycles while set at a default value are readily adjustable by the user. It is also preferable that the amplitude and/or frequency of the vibration be adjustable by the user such that the alert may be adjusted so that it is only perceived by the user when in his or her pocket, and not in a purse or holster. This may be an important feature given the variety of sensitivity from one user to another. As noted above, the alert may engage when not in the users pocket, but preferably the default setting or the user adjusted setting of the amplitude or frequency will render the alert imperceptible to the user.

The warning device may also be thermal or electrical and its depiction throughout the disclosure as one type is not intended to be exclusive. The warning signal may be emitted in increasing (intensity) and/or variation in sound frequency (tone).

The warning signal or alert as described herein may be graduated in intensity so that, much like the graduated sound intensity capacity of common alarm clocks, the level of warning may increase with number of continuous alert cycles.

The angular detection and thus management of the embodiments described herein may be by the use of accelerometers, electronic level circuitry (such as found variously, but in example in the Bushnell X 28 Trophy rifle scope, with its "auto on/off system) such that the intermittent broadcast of distance measuring light or other measurement electromagnetic signal may initiated only when a cellular handset or similar device falls within planes of the vertical corresponding to cellular telephone oriented in a plane that would be common if located in the user's pocket.

As described above, the use of an increasing intensity warning signal may be advantageous. The increasing intensity also relays to the user a degree of relativity regarding their risk of exposure. The intensity of the warning signal as noted may be an increase in volume, an increase or decrease in frequency, or an interruption.

The disclosed subject matter includes an exemplary embodiment for alerting the user that the mobile device is in the user's pocket and thus maintaining a distance between a user groin area and a device emitting radio waves.

As noted previously there are several mechanisms and methods by which the angle of incident and acceleration of the mobile device may be determined which are commonly resident on some current mobile devices. Accelerometers, inclinometer, strain gauges, magnetometers, gyroscopes, GPS receivers and inertial systems and other transducer/processor combinations are envisioned as being appropriate for this function.

The warnings or alerts are envisioned to include audio, tactile, thermal, and electrical indications, such that the warnings are perceivable by the user when the mobile device is in the user's pocket.

An aspect of the disclosed subject matter is that the nature and amplitude of the warnings discussed above may also be a dynamic function of duration, such that the longer the mobile device is determined to be in the pocket, the greater the amplitude of the warding. A duration threshold may also advantageously be incorporated.

Another aspect of the disclosed subject matter is that a bypass of the warning signal or interruption signal may be advantageously included in embodiments. A bypass switch may be employed to override the warning/interruption. The bypass switch may be implemented as a manual switch, button, contact or as a voice command.

Still another aspect of the disclosed subject matter is that the broadcast required for communication control, such as reverse pilot signals, transmit and receive power control, identification, and time synchronization need not be encumbered by the implementation of the disclosed subject matter.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method to alert a user of a mobile device located in the user's pocket in order to prevent an unsafe exposure of radiation to the user's groin area, comprising
    initiating an user warning cycle from the mobile device on a predetermined cycle, wherein the cycle includes a period in which an alert is active followed by a period in which the alert is not active;
    determining if the mobile device is in at least one of a predetermined plurality of transmission modes;
    determining if the mobile device has observed acceleration over a predetermined period of time; and
    disabling the user warning cycle if the mobile device is determined not to be in the at least one transmission mode or has not observed acceleration over the predetermined period of time.

2. The method of claim 1, further including initiating the user warning cycle if the mobile device is determined to be in the at least one transmission mode and has observed acceleration over the predetermined period of time.

3. The method of claim 1, further comprises determining the angle of incident of the mobile device, and disabling the user warning cycle based on the determination of an angle of incident.

4. The method of claim 1, wherein the predetermined plurality of transmission modes does not include voice transmissions.

5. The method of claim 1, wherein the predetermined plurality of transmission modes does not include user data transmissions.

6. The method of claim 1, further comprising determining user interaction with the mobile device and disabling the user warning based on the determined user interaction.

7. The method of claim 6, wherein the user interaction is internet surfing, and the user warning is disabled upon determination of the user interaction.

8. The method of claim 1, wherein the predetermined plurality of transmission modes does not include transmissions with an amplitude below a predetermined threshold.

9. The method of claim 1, wherein the predetermined plurality of transmission modes does not include Wi-Fi transmissions.

10. The method of claim 1, wherein the user warning cycle is adjustable by the user.

11. The method of claim 1, wherein the predetermined period of time is adjustable by the user and is less than the user warning cycle period.

12. The method of claim 1, wherein the alert is a vibration.

13. The method of claim 12, wherein the alert is adjustable by the user such that the alert in observable by the user when within the users pocket and not observable by the user when not in the user's pocket.

14. The method of claim 13, wherein the vibration is distinct from an incoming call vibration.

* * * * *